United States Patent Office 3,153,640
Patented Oct. 20, 1964

3,153,640
NITROGEN-CONTAINING COPOLYMERS AND THEIR PREPARATION
Emmett R. Barnum, Berkeley, and Lyman E. Lorensen, Orinda, Calif., assignors to Shell Oil Company, a corporation of Delaware
No Drawing. Filed Mar. 11, 1957, Ser. No. 645,602
5 Claims. (Cl. 260—86.1)

This invention relates to new polymeric products. More particularly, the invention relates to a new class of nitrogen-containing copolymers which are particularly useful as pour point depressants and viscosity index improvers as well as detergents and anti-wear agents for lubricating compositions.

Specifically, the invention provides new and particularly useful polymeric products comprising oil-soluble copolymers of a vinyl lactam and an ester of an acrylic acid and a long chain aliphatic alcohol containing at least 9 and preferably 18 carbon atoms, said copolymers having the vinyl lactam and acrylic acid ester units in a mol ratio varying from 1:1 to 1:20 and a molecular weight varying from $5 \times 10^4$ to $2 \times 10^6$ as determined by the light scattering method.

This application is a continuation-in-part of our application Serial No. 571,612, filed March 15, 1956, which is a continuation-in-part of our application Serial No. 389,840, filed November 2, 1953.

It is an object of the invention to provide a new class of polymeric products. It is a further object to provide new nitrogen-containing oleophilic copolymers and a method for their preparation. It is a further object to provide new vinyl lactam copolymers which are particularly useful and valuable as additives for lubricating compositions. It is a further object to provide new polymers which are particularly useful as pour point depressants and viscosity index improvers for lubricating compositions. It is a further object to provide new additives for lubricating compositions which act as ashless detergents and anti-wear agents. These and other objects of the invention will be apparent from the following detailed description thereof.

It has now been discovered that these and other objects may be accomplished by the novel polymeric products of the invention comprising oil-soluble copolymers of a vinyl lactam and an ester of an acrylic acid and a long chain aliphatic alcohol containing at least 9 carbon atoms, said copolymers having the vinyl lactam and the acrylic ester in a mole ratio varying from 1:1 to 1:20 and a molecular weight varying from $5 \times 10^4$ to $2 \times 10^6$. It has ben found that copolymers having these special features are particularly outstanding as additives for lubricating compositions. When they are incorporated into base lubricating compositions, even in small amounts, they display unexpected anti-wear properties as well as detergent properties. Addition of 2% by weight of these polymers, for example, tends to reduce the wear 40 to 50% and reduce the formation of sludge as much as 70%. In addition, the new copolymers also act to reduce the pour point of the lubricating compositions. Furthermore, the above copolymers also act as VI improvers. Compositions containing the new copolymers, for example, have VI values from 1.2 to 1.8 times that of the base lubricant. Further advantage is found in the fact that these special copolymers have excellent compatibility characteristics and are compatible with many additives, such as anti-oxidants, extreme pressure additives. Superiority of the new copolymers in these applications is shown in the examples at the end of the specification.

The vinyl lactam is preferably a vinyl substituted lactam of a saturated aliphatic amino carboxylic acid in which the amino and carboxyl groups are separated by from 3 to 4 carbon atoms. Examples of these gamma and delta lactams include vinyl substituted butyrolactams (containing four carbons and one nitrogen in a ring) and vinyl substituted valerolactams, including particularly the C-alkyl, C-cycloalkyl and C-aryl substituted derivatives thereof, wherein the C-substituents are substituents on the carbon atoms of the lactam ring, and generally contain from 1 to 6 carbon atoms. The N-vinyl lactams are preferred, although the C-vinyl lactams are suitable, and particularly when they are C-vinyl-N-alkyl lactams, thereby providing a tertiary nitrogen atom. The vinyl radical preferably is unsubstituted ($CH_2=CH-$), but it may be mono-substituted with an aliphatic hydrocarbon group of 1 to 2 carbon atoms, such as methyl, ethyl and vinyl.

The vinyl butyrolactams, also named vinyl pyrrolidones, are the preferred class of lactams, and especially the N-vinyl butyrolactams, with the unsubstituted ones and those which contain only hydrocarbon substituents being particularly preferred.

The vinyl pyrrolidones are exemplified by N-vinyl pyrrolidone, N-(1-methylvinyl) pyrrolidone, N-vinyl-5-methyl pyrrolidone, N-vinyl-3,3-dimethyl pyrrolidone, N-vinyl-5-ethyl pyrrolidone, N-vinyl-4-butyl pyrrolidone, N-ethyl-3-vinyl pyrrolidone, N-butyl-5-vinyl pyrrolidone, 3-vinyl pyrrolidone, 4-vinyl pyrrolidone, 5-vinyl pyrrolidone and 5-cyclohexyl-N-vinyl pyrrolidone.

The vinyl valerolactams, which may be called vinyl piperidones, are exemplified by N-vinyl piperidone, N-vinyl-6-methyl piperidone, N-vinyl-3-methyl piperidone and N-(1-methylvinyl) piperidone.

The N-vinyl lactams are readily prepared by methods known in the art, such as by the reaction of acetylenes (e.g. methylacetylene and vinylacetylene) with the inner (cyclic) amide (lactam) of the amino acid, or by condensation and dehydration of suitable chosen dialkanolamine alkanoates, e.g., diethanolamine acetate, dipropanolamine acetate and dipropanolamine propionate.

The monomers to be copolymerized with the vinyl lactams include the esters of acrylic acids and the long chain aliphatic alcohols. Examples of the acrylic acids include acrylic acid and the alpha-substituted acrylic acids, such as methacrylic acid, ethacrylic acid, alpha-phenyl acrylic acid, alpha-cyclohexyl acrylic acid and chloroacrylic acid. The long-chain aliphatic alcohols used in the esterification of these acids may be exemplified by decyl, lauryl, cetyl, stearyl, eicosanyl, nonadecanyl, 2,2,4,4,6,6-hexamethyloxyl, and the like, and mixtures thereof. Particularly preferred esters to be used are the acrylic acid and methacrylic acid esters of aliphatic monohydric alcohols, and especially alkyl alcohols, containing from 14 to 20 carbon atoms.

Examples of the acrylic acid esters used in making the copolymers include, among others, n-decyl acrylate, n-nonyl acrylate, lauryl acrylate, stearyl acrylate, decyl methacrylate, lauryl methacrylate, cetyl methacrylate, stearyl methacrylate, eicosanyl acrylate, docasanyl acrylate and the like, and mixtures thereof.

It is possible to employ small amounts, e.g., less than 30% by weight, of lower (up to 6 carbon atoms)acrylic acid esters such as butyl acrylate, methyl methacrylate, butyl methacrylate, octyl methacrylate, pentyl methacrylate, and the like, and mixtures thereof, in the preparation of the new copolymers, but in order to obtain the desired properties noted above, the amount should be maintained in minor amounts. Such replacement results in improvement in viscosity-temperature properties.

It has also been unexpectedly found that if one employs certain mixtures of the above-noted acrylic acid esters, they obain copolymers which are distinguished from the others in that they have surprisingly good pour point and VI properties. Thus, when one employs a mixture of (1) a $C_{16}$ to $C_{20}$ ester of an acrylic acid and (2) a $C_{10}$ to $C_{14}$ ester of an acrylic acid with the above-noted vinyl lactams, they obtain special copolymers which give marked improvement in pour point and VI properties obtained with the other copolymers. These mixtures preferably contain the higher esters and lower esters in a mole ratio varying from 1:1 to 1:3.

The copolymers of the present invention are prepared by heating one or more of the above-described vinyl lactams with one or more of the above-described acrylic acid esters in the presence of a polymerization initiator under conditions so as to form a copolymer having the monomers in the above-noted ratio and having a molecular weight in the desired range.

As noted above, the copolymers of the invention must have the vinyl lactam and the acrylic acid ester in a ratio varying from 1:1 to 1:20 and more preferably in a ratio of 1:1 and 1:10.

As the vinyl lactam and the acrylic esters have different polymerization rates, the proportions in which they enter the copolymer molecule will differ from the proportions in which they occur in the reaction mixture. It will be necessary, therefore, to determine before-hand the ratio of concentrations of monomers needed to give copolymers having the two monomers in the necessary ratio. This can be easily accomplished by conducting a few routine runs and examining the composition of the resulting copolymer. The initial concentration of monomers can then be adjusted so as to give the copolymer of the desired composition.

As the reaction progresses, the monomer concentration ratios change due to the difference in the rate of polymerization and, in some cases, the ratio will change so that it will not be producing copolymers having the monomers in the desired ratio. The superior products are, therefore, obtained by employing some steps during the copolymerization which will insure that the ratio of concentrations of monomers does not vary during the reaction period from the above-described limits. This may be accomplished in a variety of ways. One way, for example, comprises stopping the copolymerization after the ratio of the monomer concentrations has reached the limiting valve. This method is of particular value if the change in the ratio between the monomer concentrations during copolymerization is slow and a considerable yield of copolymer has been obtained before the limiting values have been attained.

Another method is to adjust the ratio between the monomer concentrations by adding monomer during the course of the polymerization. In this case, it is usually sufficient to add the monomer which is consumed the fastest. Such additions may be periodic or continuous.

Control over the change of ratio can be made by periodic withdrawal of samples and analyzing the product, or can be made in a homogeneous system by simply observing a physical property of the mixture which varies with the ratio of concentrations of monomers, such as boiling point, refractive index, vapor pressure, specific gravity and the like, and adding the monomer or monomers so as to bring the value up to the predetermined level for the desired product.

Copolymers of the present invention which have the superior properties noted above are those having molecular weights between 50,000 and 2,000,000 as determined by the light scattering technique described in Chem. Rev., vol. 40, page 319 (1948). Preferably, the molecular weights range from about 75,000 to 1,000,000 and more preferably from 100,000 to 800,000.

Any suitable conditions may be employed to maintain the molecular weight within the desired range. Factors which exert an influence on the molecular weight of the polymer include the method of polymerization (e.g., polymerization in emulsion, suspension, solvent solution or bulk), the nature and concentration of the catalyst employed, the temperature, and nature and amount of the monomers. When the polymerization is accomplished in solution, the molecular weight of the product will be lower when the dilution is stronger, i.e., when the concentration of solvent is greater. With the same catalyst, the higher polymerization temperature tends to give lower molecular weights.

Polymerization initiators that are particularly suited for use in preparing the claimed copolymers include various free-radical yielding catalysts as peroxide catalysts, such as, for example, benzoyl peroxide, lauroyl peroxide, tertiary butyl hydroperoxide, 2,2-bis (tertiary butyl peroxy) butane, di(tertiarybutyl) peroxide, tertiary butyl perlargonate, hydrogen peroxide, sodium or potassium persulfate, percarbonate, peracetic acid and the like. Other suitable catalysts include sodium bisulfite, diethyl sulfoxide, azo compounds, such as alpha, alpha-azodiisobutrylonitrile and the like. The amount of the initiator added may vary over a considerable range. In general, the amount of initiator added will vary from 0.1% to 5% by weight of the material being polymerized. Preferred amounts vary from 0.1% to 2% by weight.

The temperature selected will vary depending chiefly on the type of initiator selected, the desired rate of reaction and the molecular weight desired. Generally, the temperature will range from about 50° C. to 150° C., and more preferably from 60° C. to 120° C.

The polymerization may be conducted in the presence or absence of air. In most cases, however, it has been found desirable to conduct the polymerization in the absence of air, e.g., in the presence of an inert gas such as nitrogen. Atmospheric, reduced or superatmospheric pressure may be employed.

At the end of the polymerization, any unreacted monomer or monomers and/or solvents may be removed, preferably by distillation or by precipitation with appropriate solvents.

The copolymers of the present invention are substantially water-white to light colored viscous liquids to soft rubbery solids. They posses unexpected solubility and surface active properties in hydrocarbon oils which could not have been predicted and which enable them to be used for a wide variety of important applications. It has been found, for example, that the new polymers are particularly valuable as pour point depressants and VI improvers and as ashless detergents and anti-wear agents for lubricating oils. They are especially outstanding in these applications as they are readily soluble in the oils and compositions and when added even in small amount act to reduce wear, prevent formation of sludge and lower the pour point. Addition of 2% by weight of these polymers, for example, tend to reduce wear 40 to 50%, reduce the formation of sludge as much as 70%. The addition of the copolymers also lower the pour point 30 degrees or more, and increase the VI values at least 1.5 and preferably 1.2 to 1.8 times that of the base lubricant. The lubricating stocks used for this purpose may be any natural or synthetic materials having the desired lubricating properties. Thus, it may be a hydrocarbon oil obtained from a paraffinic, naphthenic, asphaltic or mixed base crude, and/or mixtures thereof. The viscosity of these oils may vary over a wide range such as from 100 SUS at 100° F. to 100 SUS at 210° F. The hydrocarbon oils may be blended with fixed oils such as castor oil, lard oil and the like and/or with synthetic lubricants such as polymerized olefins, copolymers of alkylene glycols and alkylene oxides, organic esters, e.g., 2-ethylhexyl sebacate, dioctyl polymers, e.g., dimethyl silicone polymer and the like. If desired, the synthetic lubricants may be used as the sole base lubricant or admixed with fixed oils and derivatives thereof. In addition, the base can be gasoline, ethyl fluids, fuel oils, greases, etc.

The novel copolymers are effective in the lubricating compositions in ranges varying from about 0.01% to about 10% and preferably from about 0.1% to 5% by weight of the oil.

In addition to the above-described novel copolymers the lubricating oil compositions may be modified with other additives such as other pour point depressants, other viscosity index improvers, corrosion inhibitors, extreme pressure additives, anti-oxidants and the like. Among such materials are VI and pour point agents, e.g., high molecular weight polymers, e.g., "Acryloids"; wax naphthalene condensation products, isobutylene polymers, alkylstyrene polymers; corrosion inhibitors, e.g., inorganic and organic nitrites such as $NaNO_2$ or $LiNO_2$ and diisopropylammonium nitrite or dicyclohexylammonium nitrite, metal organic phosphates, e.g., Ca or Zn dicyclohexylthiophosphate or methylcyclohexylthiophosphate; extreme pressure agents such as organic phosphites, phosphates and phosphonates, organic sulfides; anti-oxidants such as phenols and amines, e.g., octadecylamine, 26-ditert-butyl-4-methylphenol; as well as anti-wear agents, such as calcium phenates and basic polyvalent metal salts of petroleum sulfonic acids, preferably highly basic salts of this type and the like.

The new copolymers, and particularly those containing large amounts of ester, have limited solubility in water. However, they may be used in certain aqueous systems along with ionic and non-ionic emulsifying agents.

To illustrate the manner in which the invention may be carried out, the following examples are given. It is to be understood, however, that the examples are for the purpose of illustration and the invention is not to be regarded as limited to any of the specific materials recited therein. Unless otherwise specified, parts disclosed in the examples are parts by weight.

In the examples, the molecular weights were determined by light scattering method and the ratio of vinyl lactam to ester was determined by analysis for nitrogen.

The tests run on the lubricating oil compositions containing the copolymers are described below:

I. FL-2 Engine Test, CRC Handbook.
II. Cold Sludge Test (Chev. Engine).
   Test Conditions: 15 and 6 hour cyclic periods consisting of 30 minutes cyclic followed by 1½ hours cooling period.
   Speed: 600 r.p.m. idle; 1,600 r.p.m. cruise.
   Time: 27 hours (15 hours cyclic, 3 hours cruise, 6 hours cyclic, 3 hours cruise).
   Oil Temp.: cyclic, 7 to 66° C.
   Jacket Temp. in: Cyclic, 18 to 69° C.; out: 3 hrs. cruise 74° C.
   Fuel: Automotive.
   Oil req.: 2 gal.
   Oil change: 4 qt.
III. Ford EX-3 Type Test. Conditions:

| Cycle Time | Speed, r.p.m. idle | B.H.P. | Jacket temp.,° F. |
|---|---|---|---|
| 2 hrs | 500 | 0 | 125 |
| 2 hrs | 2,500 | 45 | 100 |
| 2 hrs | 2,500 | 45 | 200 |

16 of these 6 hour cycles for 96 hours total time.
Oil required—5 qt., no make up.

IV. Lauson Engine Test (LH-L2). Conditions:
   Speed (r.p.m.) _____ 1,050
   Load (h.p.) _____ 0.8
   Test (hrs.) _____ 60
   Oil Temp., ° F _____ 225
   Jacket Temp., ° F _____ 275
   Oil req. (SAE 30), ml _____ 2,000
   Oil change, ml _____ 1,020

V. High-Temperature Detergency Test: The high-temperature detergency is determined by measuring the electrical resistance of dispersions of 10% by weight carbon black and 2% polymer in a test oil. The "degree of deflocculation" is calculated as the ratio of resistance of the given system to the resistance of an undoped oil containing the same amount of carbon black, and at a constant temperature.

VI. Pour Point, ° F. (D-396-39T).
VII. Viscosity-temperature properties of polymer in oil blends. Usual viscosities measured at 100° F. and 210° F. were used to obtain viscosity indices. Another measurement of viscosity-temperature properties of polymer blends was obtained by comparing the ratio of $Vis^{100}/Vis^{-210}$ for the blend with the ratio of $Vis^{100}/Vis^{-210}$ of the base oil; the lower the blend ratio with respect to the base oil ratio the better.
VIII. Wear Test: 144 ml. of $0.1N$ $H_2SO_4$ is added to 36 ml. of test lubricant and heated to 50° C. and stirred at a constant speed for 4 hours. Cast iron strips, which are immersed in the test solution for the duration of the test, were weighed before and after test and weight loss in grams determined.
IX. Thrust Bearing Corrosion and Oxidation Test: According to National Petroleum News, September 17, 1941, R-294 and Ind. and Eng. Chem. vol. 34, p. 183.

*Example I*

This example illustrates the preparation of a copolymer from N-vinylpyrrolidone and lauryl methacrylate and demonstrates the superior properties of the copolymer as an additive for lubricating oil composition.

A. A mixture of about 2 moles of lauryl methacrylate, 1 mole of N-vinylpyrrolidone and 0.5% weight of benzoyl peroxide was placed in a suitable reaction vessel and the mixture reacted for a period of over 10 hours at 65° C. in a nitrogen atmosphere. The polymer was then dispersed in benzene and thereafter precipitated with a mixture of acetone and methanol. The resulting copolymer was an oil-soluble solid containing around 2.20% nitrogen. Analysis showed the copolymer had the N-vinylpyrrolidone lauryl methacrylate in a mole ratio of 1:1.9 and a molecular weight of about 250,000.

B. Two per cent of the copolymer produced above was dissolved in a solvent refined SAE 20 mineral lubricating oil having a viscosity index of 64. When subjected to test I it gave a lacquer rating of 7 as compared to 4.5 for the base oil. In test VI, the pour point was $+10°$ F. while that of the base oil was $+20°$ F. In test VII, the viscosity index (VI) was 111, the base oil being 64. In test VIII, the composition reduced wear by 40% over that of the base oil.

Related results are obtained by replacing the lauryl methacrylate in the above-noted preparation process with equivalent amounts of each of the following, lauryl acrylate, dodecyl acrylate and cetyl methacrylate.

*Example II*

A copolymer of lauryl methacrylate and N-vinyl pyrrolidone was prepared by the method of Example I with the same monomer ratio but in which 0.75% by weight of alpha,alpha-azodiisobutylnitrile was used as the catalyst. The molecular weight of the polymer was around 225,000.

The copolymer also displayed good detergent and anti-wear properties when tested as shown in Example I. When exposed to test No. VI and VII the copolymer displayed good pour point and VI properties.

*Example III*

A terpolymer of stearyl methacrylate/lauryl methacrylate/N-vinyl pyrrolidone in the mol ratio of 4.2/8.5/1, respectively, was prepared by the method of Example I using the monomers in a ratio of 2.8/5.6/1 and 0.2% alpha,alpha-azodiisobutylnitrile as catalyst with a reaction time of 48 hours. The polymeric material was oil-soluble and had a molecular weight over $1 \times 10^6$ as determined by the light scattering method.

Two percent of this terpolymer in a solvent refined SAE 5W mineral oil increased the viscosity index (VI) of the base oil from 95 over 140 and depressed the pour point of the base oil from $+20$ to $-30°$ F.

Example IV

A copolymer of stearyl methacrylate/N-vinyl piperidone having the monomers in a ratio of 4:1 and having a molecular weight of above $1 \times 10^6$, is obtained by heating the monomers with benzoyl peroxide as in Example I. The resulting oil soluble copolymer displays good properties as a detergent and anti-wear agent and as VI improvers for lubricating compositions.

Other representative copolymers useful in lubrication compositions of this invention include those identified below in which the monomeric units are present in the mol ratios of 1:1, 1:2, 1:4, 1:6, 1:8, 1:10 and 1:20, of the lactam to ester, said copolymers having a molecular weight in excess of 50,000: N-vinyl pyrrolidone/decyl methacrylate, N-vinyl-3-methyl pyrrolidone/cetyl methacrylate, N-vinyl pyrrolidone/stearyl methacrylate, N-vinyl pyrrolidone/stearyl acrylate, N-vinyl-3,3-dimethyl pyrrolidone/lauryl methacrylate, N-vinyl pyrrolidone/ stearyl methacrylate cetyl methacrylate, N-vinyl-3-methyl pyrrolidone/stearyl methacrylate/lauryl methacrylate, N-vinyl piperidone/stearyl methacrylate/lauryl acrylate, and N-vinyl-3-methyl piperidone/stearyl acrylate.

Example V

A terpolymer of stearyl methacrylate/lauryl methacrylate/N-vinylpyrrolidone in a mol ratio of 2/4/1, respectively, is prepared by the method of Example I using the monomers in a ratio of 1/2/1 and 0.2% alpha, alpha-azodiisobutylnitrile as catalyst. The polymeric material is oil soluble and has a molecular weight of about 800,000. This polymer displays good properties as a detergent and anti-wear agent and as VI improvers for lubricating compositions.

Example VI

A copolymer is prepared as in Example I with the exception that 10% of the lauryl methacrylate is replaced by methyl methacrylate. The resulting copolymer possesses improved viscosity-temperature properties over the copolymer shown in Example I.

Example VII

A terpolymer is prepared as in Example V with the exception that up to 20% of the stearyl and lauryl methacrylate is replaced with butyl methacrylate. The resulting copolymer possesses improved viscosity-temperature properties over the terpolymer in Example V.

We claim as our invention:

1. An oil-soluble copolymer of a C-vinyl lactam of a saturated aliphatic monocarboxylic amino acid in which the amino and carboxyl groups are separated by from 3 to 4 carbon atoms and an ester of an acrylic acid selected from the group consisting of acrylic acid and methacrylic acid and a long chain monohydric alkanol containing at least 9 carbon atoms, said copolymer having the C-vinyl lactam and acrylate ester units in a mole ratio varying from 1:1 to 1:20 and a molecular weight varying from $5 \times 10^4$ to $2 \times 10^6$ as determined by the light scattering method.

2. An oil-soluble copolymer of a C-vinyl lactam of a saturated aliphatic monocarboxylic amino acid in which the amino and carboxyl groups are separated by from 3 to 4 carbon atoms and an ester of methacrylic acid and a long chain monohydric alkanol containing from 12 to 20 carbon atoms, said copolymer having the C-vinyl lactam and acrylic ester units in a mole ratio varying from 1:1 to 1:20 and a molecular weight varying from $5 \times 10^4$ to $2 \times 10^6$ as determined by the light scattering method.

3. An oil-soluble copolymer of a C-vinyl lactam of a saturated aliphatic monocarboxylic amino acid in which the amino and carboxyl groups are separated by from 3 to 4 carbon atoms and stearyl methacrylate, said copolymer having the C-vinyl lactam and stearyl methacrylate units in a mole ratio varying from 1:1 to 1:20 and a molecular weight varying from $5 \times 10^4$ to $2 \times 10^6$ as determined by the light scattering method.

4. A process for preparing an oil-soluble copolymer useful as detergent and anti-wear agent for lubricating compositions which comprises heating a mixture of a C-vinyl lactam of a saturated aliphatic monocarboxylic amino acid in which the amino and carboxyl groups are separated by from 3 to 4 carbon atoms and an ester of an acrylic acid of the group consisting of acrylic acid and methacrylic acid and a long-chain monohydric alkanol containing at least 9 carbon atoms so as to form a product having the C-vinyl lactam and alkylate ester in a mole ratio of 1:1 and a molecular weight between $5 \times 10^4$ and $2 \times 10^6$ as determined by the light scattering method.

5. An oil-soluble copolymer of a C-vinyl lactam of a saturated aliphatic monocarboxylic amino acid in which the amino and carboxyl groups are separated by from 3 to 4 carbon atoms and lauryl methacrylate, said copolymer having the vinyl lactam and lauryl methacrylate units in a mole ratio varying from 1:1 to 1:20 and a molecular weight varying from $5 \times 10^4$ to $2 \times 10^6$ as determined by the light scattering method.

References Cited in the file of this patent

UNITED STATES PATENTS

| | | |
|---|---|---|
| 2,497,705 | Werntz | Feb. 14, 1950 |
| 2,584,968 | Catlin | Feb. 12, 1952 |
| 2,737,496 | Catlin | Mar. 6, 1956 |
| 2,767,159 | Potts et al. | Oct. 16, 1956 |

FOREIGN PATENTS

| | | |
|---|---|---|
| 532,975 | Belgium | Apr. 30, 1955 |
| 523,588 | Italy | Apr. 16, 1955 |

OTHER REFERENCES

Ham: "Polymerization of Acrylics," Textile Research Journal, vol. 24, No. 7, July 1954, pages 606 and 607 relied upon.

Kirk et al.: "Encyclopedia of Chemical Technology," volume 11, pages 656–657, Interscience Encyclopedia, New York (1953).